E. J. ESTEY.
VEHICLE WHEEL.
APPLICATION FILED MAY 1, 1909.
974,250.
Patented Nov. 1, 1910.
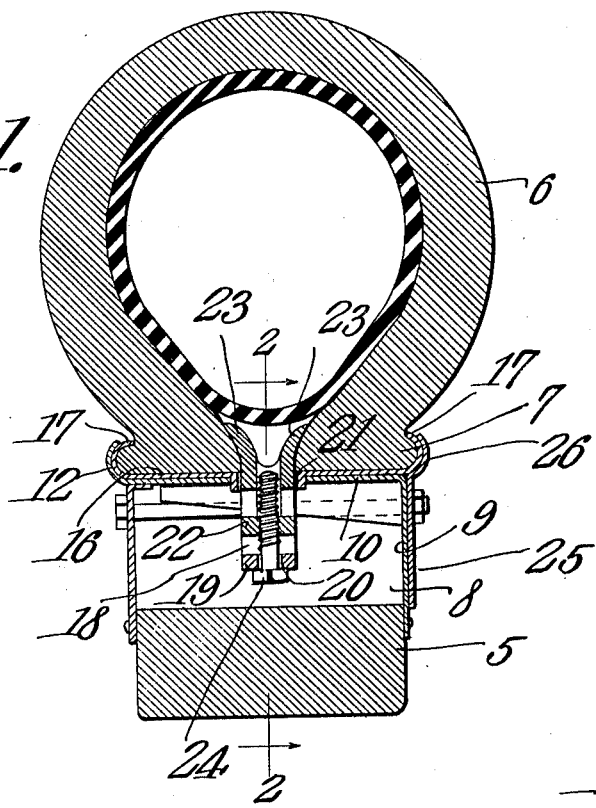
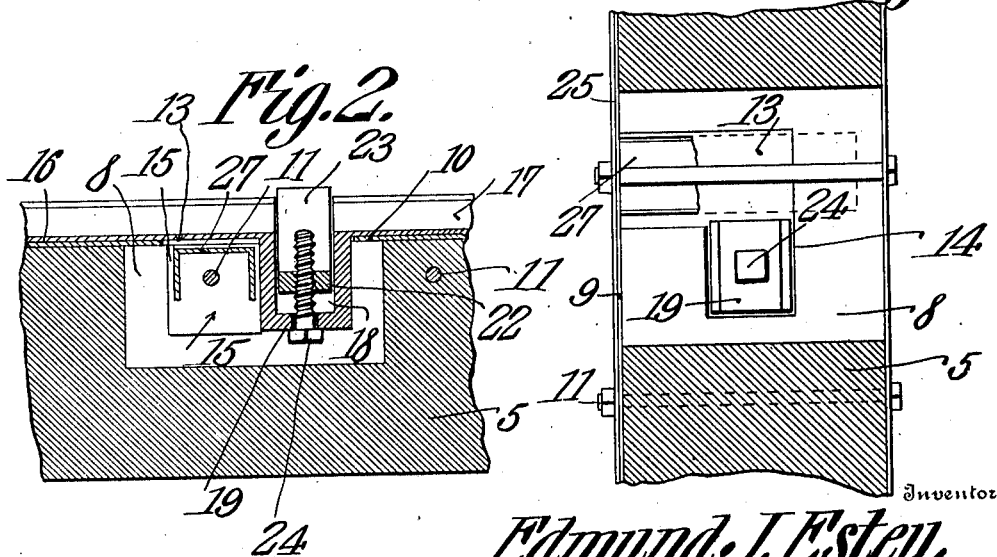
Inventor
Edmund J. Estey.
By C A Snow & Co.
Attorneys
Witnesses

UNITED STATES PATENT OFFICE.

EDMUND JOSEPH ESTEY, OF APPONAUG, RHODE ISLAND.

VEHICLE-WHEEL.

974,250.  Specification of Letters Patent.  Patented Nov. 1, 1910.

Application filed May 1, 1909. Serial No. 493,342.

*To all whom it may concern:*

Be it known that I, EDMUND JOSEPH ESTEY, a citizen of the United States, residing at Apponaug, in the county of Kent and State of Rhode Island, have invented a new and useful Vehicle-Wheel, of which the following is a specification.

It is the object of the present invention to provide an improved construction of vehicle wheel and the invention relates more specifically to the means for securing the tire upon the wheel, the object being to provide a means for this purpose of such character as to permit of ready removal of the tire and also for its ready disposal upon the wheel rim or felly.

The invention is embodied in a wheel rim composed of several sections upon one of which the tire is firmly clamped and this section disposed upon another of the sections carried preferably by the wheel felly, still another of the sections being secured to the last mentioned section whereby to retain the tire-supporting section in place thereon while the wheel is in use.

In the accompanying drawings, Figure 1 is a transverse sectional view through the felly and rim of a wheel constructed in accordance with the present invention, a tire being shown also in section and as applied to the rim. Fig. 2 is a longitudinal sectional view on the line 2—2 of Fig. 1, and Fig. 3 is a horizontal sectional view looking outwardly.

In the drawings, the felly of the wheel is indicated by the numeral 5 and the tire by the numeral 6, the tire being of the ordinary clencher type and having the usual beaded edges 7 it being divided medially of its inner periphery. The felly 5 of the wheel is of the ordinary construction except that at intervals recesses 8 are formed therein opening through its outer peripheral surface, the function of which recesses will presently be fully described.

As heretofore stated, and as shown in the drawings, the rim of the wheel is composed of a plurality of sections which when assembled are adapted to firmly and securely clamp the tire 6 in proper position upon the felly 5 of the wheel, and of these sections one is illustrated as permanently secured upon the felly and as composed of side wall 9 and a cylindrical wall 10, the side wall 9 extending inwardly at right angles from the cylindrical wall 10 and receiving between them the felly 5, there being bolts 11 engaged through the said side wall 9 of the said rim section and the felly 5 whereby to hold said sections firmly in place upon the felly. In addition to the walls just described, the section just mentioned is provided also with a flange 12 at one side, the said flange extending continuously along the cylindrical wall 10. As will be apparent from an inspection of the drawings the wall 10 of the rim section just described extends over and closes the recesses 8 in the felly 5 and formed in the wall 10 at intervals corresponding to the intervals at which the recesses 8 are located, are slots which are illustrated as extending inwardly from that side of the wall 10 opposite to the side at which the flange 12 is located as indicated by the numeral 13 and thence in the direction of extent of the rim section as a whole, as indicated by the numeral 14. In other words, the portion 14 of each slot extends at right angles to the portion 13 thereof and the slots further extend down into the side wall 9, located at that side opposite the side of the section at which the flange 12 is formed, as indicated by the numeral 15. The function of this construction will presently be fully described.

In addition to the rim section just described, the rim embodies a tire holding section in the form of a continuous strip or flat body 16 which is of a diameter slightly greater than the diameter of the wall 10 of the first described section and is fitted upon the said section as clearly shown in Figs. 1 and 2 of the drawings, and this strip 16 is provided along each edge with a tire gripping flange 17 which flanges are to receive the beaded edges 7 of the tire 6 as clearly shown in Fig. 2. Formed, at intervals upon the inner peripheral surface of the strip 16 of the tire holding section of the rim are bosses 18 each having spaced walls and a connecting wall 19 through which is formed an opening 20. There is seated in each boss, the strip 16 being provided with openings 21 which open into the boss, a tire gripping member in the form of a block 22 having oppositely flared wings 23 which form, in effect, a wedge and which engage between the edges of the divided inner periphery of the tire 6. An adjusting screw 24 is loosely engaged through the opening 20 in the wall 19 of each boss 18 and threads into the corresponding tire gripping block 22 it being understood that by loosening the screw 24, the tire may have its edge portion readily engaged between the flanges 17 and the wings 23 of the tire gripping block, the screw 24 being then tightened whereby to draw the block in the direction of the walls 19 of the boss in which it is slidably mounted and this adjustment of the block serves to bring the wings 23 thereof frictionally into engagement with the said edge portions of the tire and firmly clamp the said portions between the wings and the flanges 17 whereby the tire will be securely held against displacement from position upon the rim section.

As heretofore stated, the tire gripping means, embodied in the boss 18 and tire gripping block 22, engages or seats in the portion 14 of the slot 13 and is confined between the side walls of said slot as clearly shown in Fig. 3 of the drawings, and in order to close the slot and thereby fully confine the said means therein, there is provided a means which will now be described. The means just mentioned for closing the slot in the first described rim section of the wheel is embodied in a third rim section which will be called in the claim the locking rim section inasmuch as it serves not only to close the slot but also to lock the tire holding sections upon the first described rim section. The locking rim section is in the form of a flat annular plate 25 formed at its outer peripheral edge with a flange 26 similar in contour to the flanges 12 and 17. As shown in Fig. 1 of the drawings this locking rim is disposed flat against that side wall 9 of the first described section in which the portion 15 of the slot 13 is formed and covers the said portion of the slot and has its flange 26 receiving the corresponding flange 17 of the tire holding section and bolts 11 pass, as heretofore stated, through the walls 9 of the first described rim section and through the section 25 whereby to clamp the said section 25 firmly against the outer face of the said wall 9 of the first described section and with its flange in engagement with the said flange 17 so that the tire holding section 16 will be gripped at its edges between the flanges 12 and 26, it being in this manner secured firmly in place upon the first described section. Formed upon the inner face of the rim section 25 and projecting inwardly at right angles from said section are channeled lugs 27 which are equal in number to the slots in the first described section and project each through the portion 15 of one of the slots and beneath the wall 10 of the said first described section coincident with the transversely extending portion of the corresponding slot 13 whereby to close the portions 14 of these slots and confine the bosses 18 therein.

From the foregoing description of the invention it will be readily understood that the tire is first to be clamped upon the tire holding sections and this section is then to be fitted upon the first described section of the rim after which the clamping section 25 of the rim is secured in place whereby all of the sections are held in proper assembled relation.

What is claimed is:—

In a device of the character described, the combination with a felly provided with an opening formed upon its periphery, of a rim permanently secured upon said felly and provided with an L-shaped slot extending from one edge of the same, a tire-holding rim adapted to be removably arranged upon said first named rim, said tire-holding rim being provided with an inwardly extending boss adapted to be inserted within said L-shaped slot, a locking ring adapted to be secured upon one side of said felly for engagement with the tire holding rim, and a lug rigidly mounted upon said locking ring for insertion within said opening formed upon said felly, to confine said boss within the circumferential portion of said L-shaped slot.

In testimony that I claim the foregoing as my own, I have hereto affixed my signature in the presence of two witnesses.

EDMUND JOSEPH ESTEY.

Witnesses:
   JOHN R. WILLIAMS,
   DAVID C. CURTIS.